United States Patent [19]

Inoue

[11] Patent Number: 4,521,661
[45] Date of Patent: Jun. 4, 1985

[54] METHOD OF AND APPARATUS FOR HOLDING AGAINST MISPOSITIONING A THERMALLY DEFLECTABLE MEMBER IN AN OPERATING MACHINE TOOL

[75] Inventor: Kiyoshi Inoue, Tokyo, Japan

[73] Assignee: Inoue-Japax Research Incorporated, Yokohama, Japan

[21] Appl. No.: 349,968

[22] Filed: Feb. 18, 1982

[51] Int. Cl.$^3$ ............................................... B23P 1/08
[52] U.S. Cl. .............................. 219/69 W; 219/69 M; 219/69 R; 51/356
[58] Field of Search ................ 219/69 M, 69 E, 69 D, 219/69 R, 68, 121 PN, 497, 505; 51/356, 266

[56] References Cited

U.S. PATENT DOCUMENTS

| | | | |
|---|---|---|---|
| 3,062,104 | 11/1962 | Deflandre | 51/266 X |
| 3,315,892 | 4/1967 | Haake | 219/331 X |
| 3,814,892 | 6/1974 | Inoue | 219/69 E |
| 3,946,189 | 3/1976 | Pomella et al. | 219/69 E |
| 4,125,754 | 11/1978 | Wasserman et al. | 219/121 PN |
| 4,314,143 | 2/1982 | Bilstad et al. | 219/506 |

OTHER PUBLICATIONS

Popular Science—"Instant Hot Water Flows from Cold Water Pipe"—Jul. 1961, pp. 44–46.

Primary Examiner—M. H. Paschall
Attorney, Agent, or Firm—Karl F. Ross; Herbert Dubno

[57] ABSTRACT

A work element supported by a thermally deflectable member in an operating machine tool is held against mispositioning by causing a fluid to flow through a passage formed in the member of the machine tool performing a machining operation to hold the member in a heat-exchanging relationship with the fluid and maintaining the difference in temperature between the fluid flowing into the passage of the member and the fluid flowing out of that passage substantially constant. Two thermistors are used to detect the temperatures of the flowing fluid at an inlet side and at an outlet side, respectively, and a signal representing a temperature difference detected is compared with a threshold value representing a preselected temperature difference to provide a deviation signal which is used to control the rate of flow of the fluid through the passage and/or the temperature of the flow-in fluid. Preferably, the latter is held constant and the former is controlled in response to the deviation or control signal.

20 Claims, 1 Drawing Figure

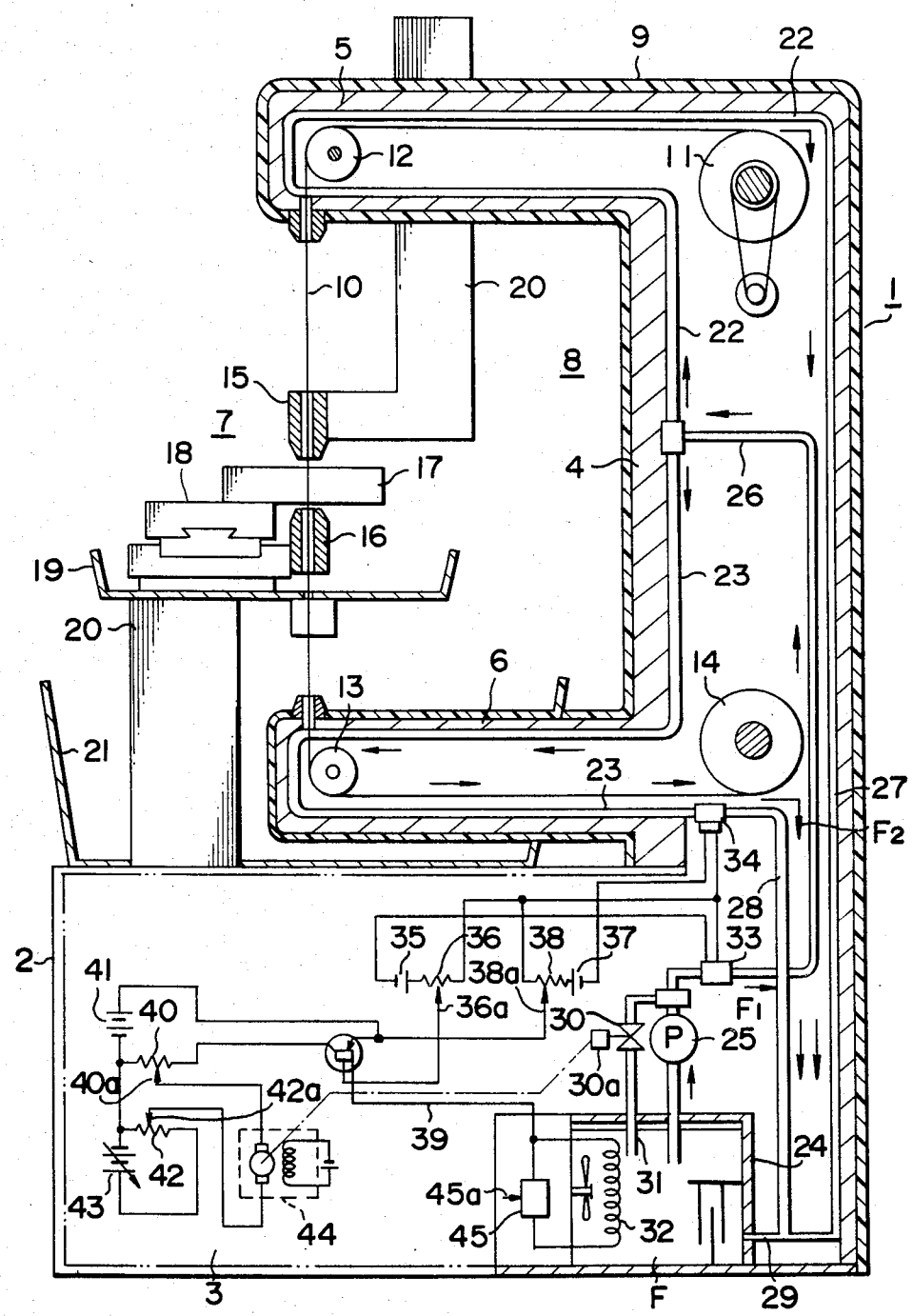

4,521,661

METHOD OF AND APPARATUS FOR HOLDING AGAINST MISPOSITIONING A THERMALLY DEFLECTABLE MEMBER IN AN OPERATING MACHINE TOOL

FIELD OF THE INVENTION

The present invention relates, in general, to preserving machining accuracy of a machine tool and, more particularly, to a new and improved method of and apparatus for holding against mispositioning a thermally deflectable member in an operating machine tool. Specifically, the method and apparatus of the invention is concerned with holding against mispositioning such a member which is arranged to directly support a work element in the operating machine tool. By the term "work element" it is intended to mean herein a working or machining tool as well as a workpiece machined thereby in the machine tool.

BACKGROUND OF THE INVENTION

A machine tool, that is a machine for machining a workpiece with a machining member, typically includes a bed, a column and a head. The workpiece is supported on a worktable which is in turn mounted on the bed. The column vertically extends upwardly from the bed. One or two arms may extend horizontally from the column which may carry the machine head at an upper region thereof. The tool may be securely supported by a tool holder which depends from the machine head or may be supported by guides arranged on the arms. These members which directly or indirectly support a work element, e.g. a machining electrode or the workpiece, are typically composed of a metal or alloy and are subject to thermal deformation or deflection. It has already been recognized that the thermal deflection of these members occur, due to development of heat in the machining zone of the tool in machining engagement with the workpiece and also where driving motors are located, and results in an error in the positions of the work elements. While the possible positioning error which may result from the thermal deflection of these members are typically of the order of micrometers, it has been found that it is not negligible where the machine tool is designed for high-precision machining operations. In an attempt to overcome the thermal deflection of such a member, a coolant may be circulated in contact with the member in the operation of the machine tool. It has been found, however, that this measure simply cannot satisfactorily remove the problem of mispositioning of the work element due to thermal deflection of the supporting member. The mispositioning is especially notable with a machine tool of the electroerosion or electrical machining type where no appreciable external force or mechanical pressure is applied across the tool and the workpiece. It has now been found that changes in heat-emitting characteristics of various heat sources which develop in the course of an operation of the machine tool and changes in temperature of the environment of the machine tool must be taken into account.

OBJECTS OF THE INVENTION

It is accordingly an important object of the present invention to provide a novel and reliable method of and apparatus for holding against mispositioning a thermally deflectable member, arranged to support a work element directly or indirectly, in an operating machine tool whereby due positioning and hence machining accuracy of the work element is assured during the course of a given machining operation of the machine tool.

The present invention seeks to provide means which sensures that the member is held under a thermally equilibrium condition throughout the machining operation.

SUMMARY OF THE INVENTION

In accordance with the present invention there is provided, in a first aspect thereof, a method of holding against mispositioning a thermally deflectable member in an operating machine tool, which method comprises the steps of: (a) passing a fluid through at least one passage formed in the said member of the machine tool performing a machining operation to hold the member in a heat-exchanging relationship with the fluid during the machining operation; and (b) maintaining the difference in temperature between the fluid flowing into the passage of the member and the fluid flowing out of the said passage substantially constant in spite of changes in temperature of the environment of the member.

Specifically, the aforementioned step (b) of the method may comprise: sensing the temperature of the flowing fluid at an inlet side to the member to provide a first signal; sensing the temperature of the flowing fluid at an outlet side to the member to provide a second signal; deriving from the first and second signals a third signal representing the said difference in temperature; comparing the third signal with a threshold value representing a preselected difference in temperature between the fluid flowing into the passage and the fluid flowing out of the passage to provide a fourth signal; and controlling at least one parameter of the flowing fluid, the parameters including the rate of flow of the fluid through the passage and the temperature of the fluid into the passage, with the fourth signal so as to maintain the said difference in temperature substantially at said preselected difference.

Preferably, the temperature of the fluid flowing into the passage is held constant and the rate of flow of the fluid through the passage is controlled in response to the fourth signal.

The invention also provides, in a second aspect thereof, an apparatus for holding against mispositioning a work element supported by a thermally deflectable member in an operating machine tool, which apparatus comprises: fluid supply means for causing a fluid to flow through at least one passage formed in the member of the machine tool performing a machining operation to hold the member in a heat-exchanging relationship with the fluid during the machining operation; means for sensing the difference in temperature between the fluid flowing into the passage and the fluid flowing out of the passage to provide a sensing signal; and means responsive to the sensing signal for controlling at least one parameter of the flowing fluid, the parameters including the rate of flow of the fluid through the passage and the temperature of the fluid flowing into the passage so as to maintain the said difference in temperature substantially constant.

Specifically, the sensing means may include first means for sensing the temperature of the flowing fluid at an inlet side to the member to provide a first signal; second means for sensing the temperature of the flowing fluid at an outlet side to the member to provide a second signal and means for deriving from the first and second signals a third signal constituting the sensing signal. Here, each of the first and second sensing means may comprise a thermistor connected in series with a voltage supply. A sensing resistor may be connected in circuit with the thermistor and its voltage supply to develop each of the first and second signals thereat.

The apparatus preferably includes further means for maintaining the temperature of the fluid flowing into the passage substantially constant. The control means is then adapted to control the rate of flow of the fluid flowing through the passage in response to the sensing signal.

BRIEF DESCRIPTION OF THE DRAWING

These and other objects and features of the invention as well as advantages thereof will become more readily apparent from the following description made with reference to the accompanying drawing in which the sole FIGURE is a schematic view diagrammatically illustrating an apparatus embodying the present invention.

SPECIFIC DESCRIPTION

Referring now to the drawing, a traveling-wire machine tool is shown and designated at 1. The machine 1 shown includes a base 2 formed with a hollow compartment 3 which may accommodate a tank (not shown) for receiving a machining fluid. From the base 2 there extends vertically a column 4 from which a pair of parallel arms 5 and 6 horizontally extend defining a machining zone 7 therebetween. The arms 5 and 6 and the column 4 which may be hollow and may also be unitary as shown constitute a C-form machine frame generally designated at 8. The outer wall of the frame 8 is covered with a layer of thermal insulator 9 such as a ceramic or glass-fiber reinforced synthetic resin material which serves also to reinforce the structure of the machine 1.

In the machine 1, a wire 10 which can be an abrasive wire tool for abrasive traveling-wire machining or a wire tool electrode for traveling-wire EDM is fed from a supply spool 11 shown disposed in the column 4, is guided over guide rollers 12 and 13 shown disposed in the arms 5 and 6, and is collected onto a takeup spool 14 shown disposed in the column 4. In the machining zone 7, the wire 10 is passed between a pair of guide members 15 and 16, and is arranged to traverse a workpiece 17 securely mounted on a work support 18 which is in turn movably mounted on the floor of a worktank 19 and disposed therein. The upper guide member 15 is secured to a support 20 depending from the upper arm 5 whereas the lower guide member 16 is secured to the work support 18. Although not shown, one or more nozzles may be disposed to supply a machining liquid to a working gap or interface defined between the traveling wire 10 and the workpiece 17 juxtaposed therewith. The work support 18 comprises a cross slide constituted by a pair of mutually orthogonally movable component tables which are driven in the direction of an x-axis and y-axis by a pair of motors (not shown), respectively, for displacing the workpiece 17 in a horizontal or x-y plane along a predetermined contouring path in accordance with a sequence of drive signals furnished from a NC (numerical control) unit (not shown) based upon preprogrammed instructions. The worktank 19 is supported by a stand 20 which stands upright from the floor of a receptacle 21 which is in turn securely mounted on the base 2 for collecting splashes of the machining liquid. For electrical machining operation, e.g. EDM, a machining power supply (not shown) is provided for applying a machining current between the wire electrode 10 and the workpiece 17 to electroerosively remove material from the latter. No external mechanical pressure is then applied across the tool 10 and the workpiece 17. The machine tool of this type is therefore not required to be and hence is not constructed as rigid as those of conventional mechanical type. Supporting members such as arms 5 and 6 will then be of relatively low rigidity and thus more liable to thermal deformation.

The arms 5 and 6 and the column 4, or generally the frame 8, are formed with fluid passages 22, 23. These passages are designed to circulate a fluid F therethrough for the purpose of preventing the arms 5 and 6, and possibly also the column 4, from beng thermally deflected and are shown by pipes which are arranged to run along the inner walls of the hollow frame 8. The fluid F may be either liquid, e.g. water, or gas, e.g. air, and may also be a refrigerant. The fluid F for circulation is stored in a vessel 24 shown in the base compartment 3 and is forced by a pump 25 into an inlet conduit 26, then diverted to flow through the passages 22 and 23 and, in turn, through passages 27 and 28 and is eventually returned via an outlet conduit 29 to the reservoir 24. The pump 25 has a valve 30 and a return pipe 31 arranged in shunt therewith. A cooling (or heating) coil 32 is provided in the reservoir 24.

While the machine 1 is in the stand-by state, the only thermal source which may affect the positioning accuracy of the frame 8 will be the environment of the machine 1. When the environment is held at a temperature within a suitable range, the thermal deformation of the frame will be substantially nil and, if the temperature changes within the range, need practically not to be taken into account and will not materially affect the positioning accuracy of the frame or a portion thereof. With the machine 1 in operation, however, various heat emitting sources develop in the machine. Machining heat generates at the working gap or interface between the wire 10 and the workpiece 17. In addition, various motors are energized for driving the wire 10, driving the worktable 18 and pumping the machining liquid, and become further sources emitting heat of varying temperatures at various locations while the machining zone 7 is flooded or splashed with the working liquid which can be a still further heat (cooling) source. These various heat sources tend to deform or thermally affect the frame 8 or portions thereof, thus creating positioning errors of these parts. It has been found that merely cooling of these parts by circulating a coolant through passages formed therein cannot solve the problem of their thermal deformations and positioning errors.

Not only the thermal deformations and consequential positioning errors grow in general with lapse of machining time which may last for a period from several hours to several tens of hours, it has now been found that changes occur from time to time in the heat-emitting characteristics of the heat sources in the operating machine and, coupled with changes in environmental temperature of the machine working for a long time, result in significant changes in the machining accuracy which cannot be removed by simply circulating a coolant through the passages in the frame 8.

In the embodiment of the invention shown, the deflection preventive fluid F in the reservoir 24 is cooled or heated by a cooling or heating coil 32 to a temperature higher or lower by a certain degree than the temperature of the environment of the machine 1. The temperature of the fluid F in the reservoir 24 is thus preferably held in a fixed range or held constant. As the fluid F is driven by the pump 25 to flow through passages 22, 23 there is effected heat exchange between the flowing fluid F and the body of the frame 8 thermally affected by the environment and the heat sources so that a temperature differential is created between the fluid F1 at the inlet side and the fluid F2 at the outlet side. It has been found that by maintaining the temperature differential constant in spite of changes in temperatures of the environment and the heat sources, the positioning accuracy of the frame 8 is advantageously preserved.

In embodying the principles of the invention, the arrangement shown incorporates thermistors 33 and 34 disposed at a preselected site of the inlet conduit 26 and at a preselected site of the outlet conduit 27, 28 or 29, respectively, to sense the temperature of the fluid F1 flowing into the conduits 22, 23 and the temperature of the fluid F2 flowing out. The thermistor 33 is connected to its voltage supply 35 via a sensing resistor 36 and the thermistor 34 is connected to its voltage supply 37 via a sensing resistor 38. It will be seen that the temperature of the fluid F1 flowing in and sensed by the thermistor 33, is indicated by a voltage drop at the resistor 36 and the temperature of the fluid F2 flowing out and sensed by the themistor 34 is indicated by a voltage drop at the resistor 38. The resistors 36 and 38 are provided with their adjustable taps 36a and 38a which are adjusted so as to provide no voltage difference therebetween when there is no difference in temperature between the flow-in fluid F1 and the flow-out fluid F2. If there is any difference between the temperature sensed by the thermistor 33 and the temperature sensed by the thermistor 34, there will develop a voltage drop across the taps 36a and 38a.

A pnp transistor 39 is provided having its emitter electrode connected to the tap 38a and its base electrode connected to the tap 36a. The collector electrode of the transistor 39 is connected via a resistor 40 to the negative terminal of its voltage supply 41 whose positive terminal is returned to the emitter electrode of the transistor 39. If there is any voltage drop across the taps 38a and 36a the transistor 39 is rendered conductive and allows the current proportional to that voltage drop to pass through the emitter and collector electrodes and through the resistor 40 having its tap 40a. The tap 40a thus provides a voltage drop repesenting the temperature differential between the flow-out fluid F2 and the flow-in fluid F1 sensed by the thermistor 34 and 33, respectively. A further resistor 42 having its tap 42a is energized by an adjustably fixed voltage source 43 to develop a fixed reference or threshold voltage at the tap 42a. The junction of the voltage source 41 and the sensing resistor 40 and the junction of the voltage source 43 and the sensing resistor 40 are tied together. The voltage source 43 is adjusted so that there is no voltage drop across the taps 40a and 42a when the temperature difference between the flow-out fluid F2 and the flow-in fluid F1 is a reference value preset at the tap 42a. If there is any deviation of the temperature difference between the flow-out fluid F2 sensed by the thermistor 34 and the flow-in fluid F1 sensed by the thermistor 33 from the reference value, there develops a voltage drop across the taps 40a which is proportional to that temperature deviation.

Such a signal indicating a deviation from a preset value of the difference between the temperature of the flow-out fluid F2 and the temperature of the flow-in fluid F1 is used to make this deviation nil. To this end, either or both of the flow (volume) rate of the circulating fluid F and the temperature of the flow-in fluid F1 may be controlled.

Accordingly, the valve 30 is designed to be controllable to open and allow change in the flow rate of the fluid F1 flowing into passages 22, 23. The valve 30 is shown having a valve stem 30a movable by a motor 44 to control the valve opening. When the opening of the valve 30 is enlarged, the flow rate of the fluid F1 into passages 22, 23 is reduced. When the opening of the valve 30 is reduced, the flow rate of the fluid F1 into the passages is increased. The motor 44 is connected to the taps 40a and 42a and driven in response to the voltage signal indicating the temperature difference between the flow-out fluid F2 and the flow-in fluid F1. If there is a deviation of the temperature difference from the preset value, the motor 44 is driven to gradually close or open the valve 30 to increase or decrease the rate of flow of the flow-in fluid F1 through the passages 22, 23 so that greater or lesser amount of heat may be absorbed from the frame 8 until the preset temperature difference is achieved across the outlet and inlet sides 27, 28; 26. The motor 44 is driven in one of two rotary directions depending on the polarity of the voltage signal which develops across the taps 40a and 42a, that is depending on whether the sensed temperature difference is higher or lower than the preset threshold level, to close or open the valve 30 accordingly.

Alternatively or in addition, the temperature difference deviation signal which develops across the taps 40a and 42a may be applied through a control input 45a to a power supply 45 for energizing the cooling or heating coil 32 to control the temperature of the flow-in fluid F1 until the preset temperature difference is achieved.

Preferably the temperature of the flow-in fluid F1 should be maintained constant while the rate of flow of the fluid is controlledly varied. The themistor 34 and the sensing resistor 36 may then be used to indicate the actual temperature of the fluid F1 which is compared with a preset constant value. The deviation signal is applied to the power supply 45 through the control input 45a to maintain the temperature of the flow-in fluid F1 at the preset value.

It will be understood that the principles of the present invention is applicable not only to the frame 8 as a whole but to one or more portions thereof relatively, the upper arm 5 and/or the lower arm 6, and/or one or more of the members in the machine, e.g. the guide support 20, the worktable 18 and the stand 20, which tend to be thermally affected or deformed to cause the positioning errors during the course of operation of the machine 1.

As described in the foregoing, there is provided according to the present invention an improved method of preserving the positioning accuracy of a member in a machine tool and thereby preserving the machining accuracy in the operation of the machine tool. By virtue of the present invention, the member is advantageously held under a fixed thermally equilibrium condition, in spite in changes in temperature of the environment of the member, during a given course of operation of the machine tool. The thermal deformation of a member is thus held to a minimum and the unavoidable minimum deformation is held constant so that there may be no material change in the positioning accuracy of the member to allow the machine tool to perform a given machining operation with due precision.

What is claimed is:

1. A method of holding against mispositioning a work element in an operating machine tool in which a thermally deflectable member supporting said work element is disposed in a thermal environment of variable temperature created at least in part by operation of said machine tool so that said member undergoes thermal deflection to variable extent tending to cause the mispositioning of said element, said method comprising the steps of:

(a) passing a fluid through at least one passage formed in said thermally deflectable member of the machine tool performing a machining operation so that said member and said fluid are in heat-exchanging relationship in said operating machine tool; and (b) establishing, for said machining operation, a preselected difference in temperature between said fluid flowing into said passage and said fluid flowing out of said passage;

(c) controlling at least one of parameters of said flowing fluid, which parameters include the rate of flow of the fluid through said passage and the temperature of the fluid flowing into said passage, so as to maintain said preselected difference in temperature in spite of changes in the temperature of said thermal environment during said machining operation, thereby maintaining the extent of thermal deflection of said member substantially constant while said machine tool is operating.

2. The method defined in claim 1 wherein said fluid flowing into said passage has a predetermined temperature while said rate of flow is controlled constituting said at least one parameter.

3. The method defined in claim 1 wherein step (c) is carried out by:

sensing the temperature of said flowing fluid at an inlet side of said passage to provide a first signal;

sensing the temperature of said flowing fluid at an outlet side of said passage to provide a second signal;

deriving from said first and second signals a third signal representing a difference in temperature;

comparing said third signal with a threshold value representing said preselected difference in temperature between said fluid flowing into said passage and said fluid flowing out of said passage to provide a fourth signal; and using said fourth signal to control at least one parameter.

4. The method defined in claim 3 wherein said rate of flow of said fluid flowing into said passage is controlled in response to the fourth signal while the temperature of said fluid flowing into said passage is maintained substantially constant.

5. The method defined in claim 3 wherein said fourth signal represents an algebraic difference between said third signal and said threshold value and said at least one parameter is controlled substantially in proportion to said algebraic difference constituting said fourth signal.

6. The method defined in claim 1, claim 2, claim 3, claim 4 or claim 5 wherein said member is at least one member directly or indirectly supporting a work element in said operating machine tool.

7. The method defined in claim 6 wherein said work element is a machining tool.

8. The method defined in claim 6 wherein said work element is a workpiece being machined by a machining tool.

9. The method defined in claim 1, claim 2, claim 3, claim 4 or claim 5 wherein said member is at least one member selected from the group which consists of a workpiece-supporting member, a worktable for supporting a workpiece, a tool-supporting member, an arm for supporting a machining tool, and a head, frame and column of said machine tool.

10. The method defined in claim 1, claim 2, claim 3, claim 4 or claim 5 wherein said machine tool is a traveling-wire machine for machining a workpiece with a wire-form tool and said member includes at least one of two parallel arms extending horizontally from a vertically standing column of said machine tool.

11. The method defined in claim 10 wherein said tool is an abrasive wire-form tool for machining said workpiece at least in part by abrasive action.

12. The method defined in claim 10 wherein said tool is an electrically conductive wire-form electrode tool for machining said workpiece at least in part by electroerosive action.

13. The method defined in claim 1 wherein said fluid is a liquid.

14. The method defined in claim 13 wherein said liquid is water.

15. The method defined in claim 1 wherein said fluid is a gas.

16. The method defined in claim 15 wherein said gas is air.

17. An apparatus for holding against mispositioning a work element in an operating machine tool in which a thermally deflectable member supporting said work element is disposed in a thermal environment of variable temperature created at least in part by operation of said machine tool so that said member undergoes thermal deflection to variable extent tending to cause the mispositioning of said element, said apparatus comprising:

fluid supply means for pumping a fluid to flow through at least one passage formed in said thermally deflectable member so that said member and said fluid are in heat-exchanging relationship, in said operating machine tool;

means for sensing the difference in temperature between said fluid flowing into said passage and said fluid flowing out of said passage to provide a sensing signal; and means responsive to said sensing signal for controlling at least one of parameters of said flowing fluid, said parameters including the rate of flow of said fluid through said passage and the temperature of said fluid flowing into said passage, so as to maintain said difference in temperature substantially constant, in spite of changes in the temperature of said thermal environment, whereby to maintain the extent of thermal deflection of said member substantially constant while said machine tool is operating.

18. The apparatus defined in claim 17 wherein said sensing means includes first sensing means for sensing the temperature of said flowing fluid at an inlet side to said member to provide a first signal, second sensing means for sensing the temperature of said flowing fluid at an outlet side to said member to provide a second signal and means for deriving from said first and second signals a third signal constituting said sensing signal.

19. The apparatus defined in claim 18 wherein each of said first and second sensing means comprises a thermistor.

20. The apparatus defined in claim 17, claim 18 or claim 19, further comprising means for maintaining the temperature of the fluid flowing into said passage substantially constant, said control means being adapted to control the rate of flow of said fluid flowing through said passage in response to said sensing signal.

* * * * *